United States Patent

Ogaz et al.

[11] Patent Number: 6,101,400
[45] Date of Patent: Aug. 8, 2000

[54] METHODS AND APPARATUS FOR IMPROVED BASE STATION TRANSCEIVERS

[75] Inventors: Ronald Steven Ogaz, Los Gatos; Gerald Edward Stark, Sunnyvale, both of Calif.

[73] Assignee: Interwave Communications, Inc., Menlo Park, Calif.

[21] Appl. No.: 08/914,983

[22] Filed: Aug. 20, 1997

[51] Int. Cl.⁷ ...................................................... H04B 1/00
[52] U.S. Cl. ........................ 455/561; 455/422; 455/560; 455/524
[58] Field of Search .................................. 455/422, 561, 455/562, 550, 524, 525, 436, 11.1, 450

[56] References Cited

U.S. PATENT DOCUMENTS

| 5,243,598 | 9/1993 | Lee ........................................... 455/562 |
| 5,555,260 | 9/1996 | Rinnbäck et al. . |
| 5,619,551 | 4/1997 | Yahagi .................................... 455/560 |

FOREIGN PATENT DOCUMENTS

| 0 440 081 A2 | 8/1991 | European Pat. Off. . |
| WO 96/27269 | 9/1996 | WIPO . |

OTHER PUBLICATIONS

European Patent Office, "Notification of Transmittal of The International Search Report," Dec. 14, 1998, International Searching Authority, 1 page.

European Patent Office, "International Search Report," Dec. 14, 1998, International Searching Authority, 3 pages.

*Primary Examiner*—Doris H. To
*Attorney, Agent, or Firm*—Flehr Hohbach Test Albritton & Herbert LLP

[57] ABSTRACT

A base transceiver station (BTS) in a cellular communication system having a base station controller (BSC) and a mobile services switching center (MSC). The BSC is configured for facilitating communication between the BSC and a plurality of mobile stations (MS's). The communication with the plurality of the MS's is accomplished via radio frequency (RF) medium. The BTS includes a first interface circuit for coupling the BTS with the BSC. The BTS further includes a processor coupled to the first interface circuit for processing first digital data received from the BSC to form second digital data. There is further included a first central transceiver (CTRX) circuit coupled to the processor. The first CTRX circuit is co-resident with the processor and the first interface circuit. The BTS further includes a first remote transceiver (RTRX) circuit coupled to the first CTRX circuit. The first RTRX circuit includes a first antenna circuit for communicating with a first MS of the plurality of MS's via the RF medium, wherein the first RTRX circuit is implemented in a geographically remote manner from the first CTRX circuit.

9 Claims, 8 Drawing Sheets

METHODS AND APPARATUS FOR IMPROVED BASE STATION TRANSCEIVERS

BACKGROUND OF THE INVENTION

The present invention relates to apparatus and methods for improving cellular communication networks. More particularly, the present invention relates to improved base transceiver stations (BTS) architectures in a cellular communication network.

Cellular communication systems are well known in the art. In a typical cellular communication, the mobile stations (MS's) may transmit and receive voice and/or data with the cellular network and one another utilizing radio waves. To facilitate discussion, FIG. 1 depicts the architecture of a cellular communication network 100 that implements the well-known Global System for Mobile Communication (GSM) standard. Although the GSM cellular network is chosen herein for illustration purposes, it should be borne in mind that the invention disclosed herein is not limited to any particular standard.

In FIG. 1, there is shown a plurality of mobile stations (MS's) 102, 104, and 106, representing the mobile interface with the cellular users. In a typical network, MS's 102, 104 and 106 may be, for example, the mobile handsets or the fixed mobile stations mounted in vehicles. Mobile stations 102, 104, and 106 typically include radio and processing functions for exchanging voice and data via radio waves with transceivers (TRX's) in base transceiver stations (BTS's) 114 and 116. The transceivers (TRX's) are shown in FIG. 1 as transceivers 114a, 114b, 114c, 116a, and 116b. The BTS's may be thought of, in one sense, as the counterpart to the MS's within the cellular network, and its main role is to connect the mobile stations with the rest of cellular communication network 100.

There is also shown in FIG. 1 a base station controller (BSC) 118, whose function is to monitor and control the BTS's. There may be any number of BSC 118 in a network, whose responsibility includes, among other responsibilities, radio interface management, e.g., the allocation and release of radio channels and hangover management. Mobile Services Switching Center (MSC) 120 controls one or more BSC's 118 and provides the basic switching function within the cellular network, including setting-up of calls to and from the MS's. MSC 120 also provides the interface between the cellular network users (via the BSC and BTS) with external networks (e.g., PSTN or public switched telephone network). The components of GSM cellular network 100 are well known to those skilled in the art and are not discussed in great detail here for brevity's sake. Additional information pertaining to GSM and the cellular networks implementing the GSM standard may be found in many existing references including, for example, Redl, Weber & Oliphant, *An Introduction to GSM* (Artech House Publishers, 1995).

In the prior art, the radio circuitries of the TRX's are typically implemented such that they co-locate with other circuits of the BTS. By way of example, FIG. 2 illustrates in greater detail exemplary prior art BTS 114 of FIG. 1, including TRX's 114a, 114b, and 114c. As is typical, the antennas of the prior art TRX's co-locate with the BTS such that the BTS defines the cell. Although one antenna is shown to facilitate simplicity of illustration, separate transmit and receive antennas may be provided for each TRX, as is well known. Other major functional blocks of BTS 114 includes ABIS interface 202, which implements the circuitry necessary for interfacing between BTS 114 and its BSC. CPU circuit 204 implements the call processing functions, including for example LAPDm processing, speech framing, channel coding, interleaving, burst formatting, ciphering, modulation, and the like. The architecture of the prior art BTS is well known and is not discussed here in great detail for simplicity's sake.

It has been found, however, that the conventional BTS architecture has many disadvantages. By way of example, the integration of the radio circuitries of the TRX's and the processing circuitries of the BTS in one unit results in a complex and maintenance-intensive electronic subsystem. Yet prior art BTS's are often installed in locations selected primarily for optimum radio transmission quality such as on top of buildings and other outdoor structures instead of ease of access. These locations, being exposed to the elements, are typically hostile to the delicate and complex electronic circuits of the prior art BTS. Accordingly, these factors tend to render the installation, maintenance, and upgrade of prior art BTS's difficult and expensive.

The integration of the radio circuitries of the TRX's in the prior art BTS also limits the flexibility with which the cell can be modified to accommodate changes in capacity. In the prior art, the BTS, which contains the co-resident TRX antennas, essentially defines the cell. Although some cell shaping may be accomplished by, for example, employing directional antennas, the cell is more or less limited by the transmit power of the antennas in the BTS. Scaling the transmit power upward increases the cell size at the expense of capacity since the use of larger cells reduces the ability to reuse frequencies among neighboring cells. Increasing the transmit power also increases the amount of heat generated, thereby reducing the reliability of the circuitries in the prior art BTS unless fans and/or additional heat dissipation techniques are employed.

In view of the foregoing, there are desired improved BTS architectures for overcoming the disadvantages associated with prior art BTS's. In particular, there are desired BTS architectures which offer improved reliability and simplified maintenance, as well as increase the flexibility with which the cell can be modified to accommodate changes in capacity.

SUMMARY OF THE INVENTION

The invention relates, in one embodiment, to a base transceiver station (BTS) in a cellular communication system having a base station controller (BSC) and a mobile services switching center (MSC). The BSC is configured for facilitating communication between the BSC and a plurality of mobile stations (MS's). The communication with the plurality of the MS's is accomplished via radio frequency (RF) medium. The BTS includes a first interface circuit for coupling the BTS with the BSC. The BTS further includes a processor coupled to the first interface circuit for processing first digital data received from the BSC to form second digital data. There is further included a first central transceiver (CTRX) circuit coupled to the processor. The first CTRX circuit is co-resident with the processor and the first interface circuit. The BTS further includes a first remote transceiver (RTRX) circuit coupled to the first CTRX circuit. The first RTRX circuit includes a first antenna circuit for communicating with a first MS of the plurality of MS's via the RF medium, wherein the first RTRX circuit is implemented in a geographically remote manner from the first CTRX circuit.

In another embodiment, the BTS further includes a second remote transceiver (RTRX) circuit coupled to the first CTRX circuit. The second RTRX circuit includes a second antenna circuit for communicating with the first MS via the RF medium. The first CTRX includes an RF quality selection circuit for selecting one of the first RTRX and the second RTRX for use in communicating with the first MS.

These and other advantages of the present invention will become apparent upon reading the following detailed descriptions and studying the various figures of the drawings.

BRIEF DESCRIPTION OF THE DRAWINGS

The invention, together with further advantages thereof, may best be understood by reference to the following description taken in conjunction with the accompanying drawings in which like reference numbers refer to like structures/items and in which.

To facilitate discussion.

DETAILED DESCRIPTION OF THE PREFERRED EMBODIMENTS

Figure 1:
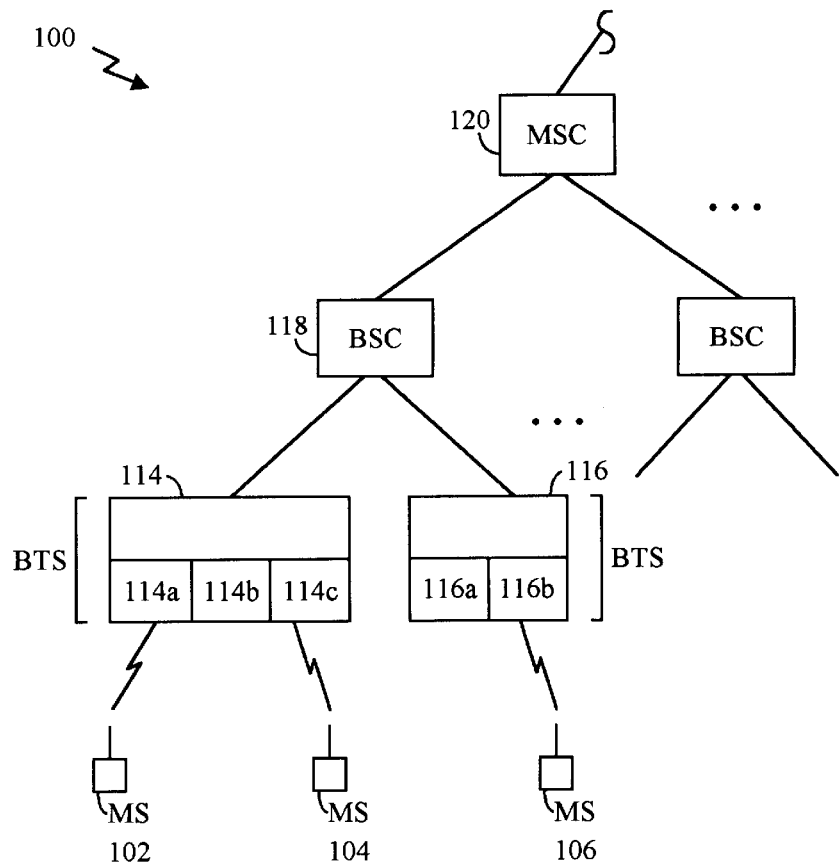
FIG. 1 depicts the architecture of a conventional cellular communication network.
Figure 2:
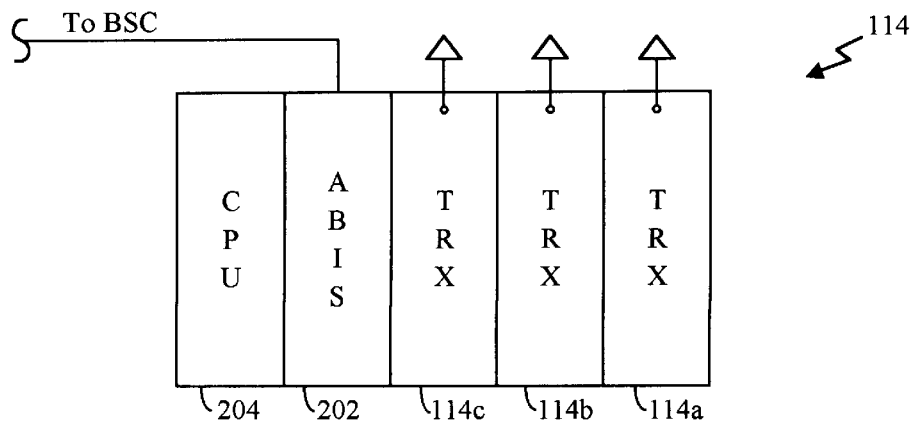
FIG. 2 illustrates in greater detail the prior art BTS of FIG. 1.

The present invention will now be described in detail with reference to a few preferred embodiments thereof as illustrated in the accompanying drawings. In the following description, numerous specific details are set forth to provide a thorough understanding of the present invention. It will be obvious, however, to one skilled in the art, that the present invention may be practiced without some or all of these specific details. In other instances, well known structures and process steps have not been described in detail to not unnecessarily obscure the present invention.

In accordance with one aspect of the present invention, there is provided a novel and nonobvious concentrated BTS (CBTS) architecture in which the TRX is divided into two TRX subsystems: a central TRX subsystem which co-resides with the CBTS and a remote TRX subsystem which is geographically remote from the CBTS and the central TRX. In accordance with this aspect of the present invention, the remote TRX includes the RF antenna circuitries that are employed for transmitting and receiving signaling and user data with the MS's via RF signals. As the term is employed hereinafter, user data refers to non-voice call data (such as short messages, text, graphics, or voice files, and the like) as well as voice calls between cellular users.

The antenna circuitries in the remote TRX convert the data from a digital format into RF signals for transmission to the MS's and convert RF signals from the MS's into digital data for processing by the cellular network. Although additional processing capabilities may be built into the remote TRX if desired, it is in general preferable to keep the circuitries within the remote TRX simple to simplify maintenance and upgrade. Additionally, since the remote TRX may be implemented in hard-to-reach locations (e.g., locations which offer optimal transmission quality such as the top of building or other structures) or be exposed to the elements, simple remote TRX designs promote ruggedness, which reduces maintenance costs.

The remote TRX is coupled to the central TRX at the CBTS through an appropriate transmission medium such as a conductive or a fiber optic medium. Since the CBTS no longer contains the antenna circuitries, the transmission quality no longer depends on the location of the CBTS. Accordingly, it becomes possible to locate the CBTS inside to offer the BTS circuitries greater protection from the elements or to locate the CBTS at a location that is selected for convenient access for maintenance and upgrade.

On the selected transmission medium, an appropriate physical layer protocol is then implemented. In one embodiment, the physical layer represents one of the well known E1, E2, or E3 protocols although any other suitable physical layer protocol may also be employed. Other embodiments could be HDSL, OC3, or OC3—Optical.

For actual transmission between the remote TRX and its corresponding central TRX at the CBTS, an appropriate transport protocol is also implemented on top of the physical layer protocol. The transport protocol may represent any suitable protocol and may in some cases represent packet-switching or TDM protocols. In the one embodiment, an Asynchronous Transmission Mode (ATM) protocol is employed. In the another embodiment, a Frame Relay protocol is employed.

The central TRX, which is co-resident with the CBTS, includes interface circuits necessary for communicating with the remote TRX's using the aforementioned transport and physical layer protocols.

The CBTS preferably also includes the bulk of the processing circuitries necessary for preparing the digital data from the cellular network for transmission via the air interface. Such CBTS circuits include, for example, the well known circuits for processing the messages received from the MSC and BSC for call setup and system control, speech processing and ABIS interface circuits. One embodiment also includes channel coding, interleaving, burst formatting, ciphering, and others. In general, the bulk of the circuitries preferably resides in the CBTS since, as mentioned earlier, it is usually desirable to keep the remote TRX design simple and rugged. If maintenance and/or upgrade is required, the fact that the bulk of the circuitries is located with the CBTS (i.e., out of the elements or in an easily accessible location) substantially simplifies these tasks.

Figure 3:
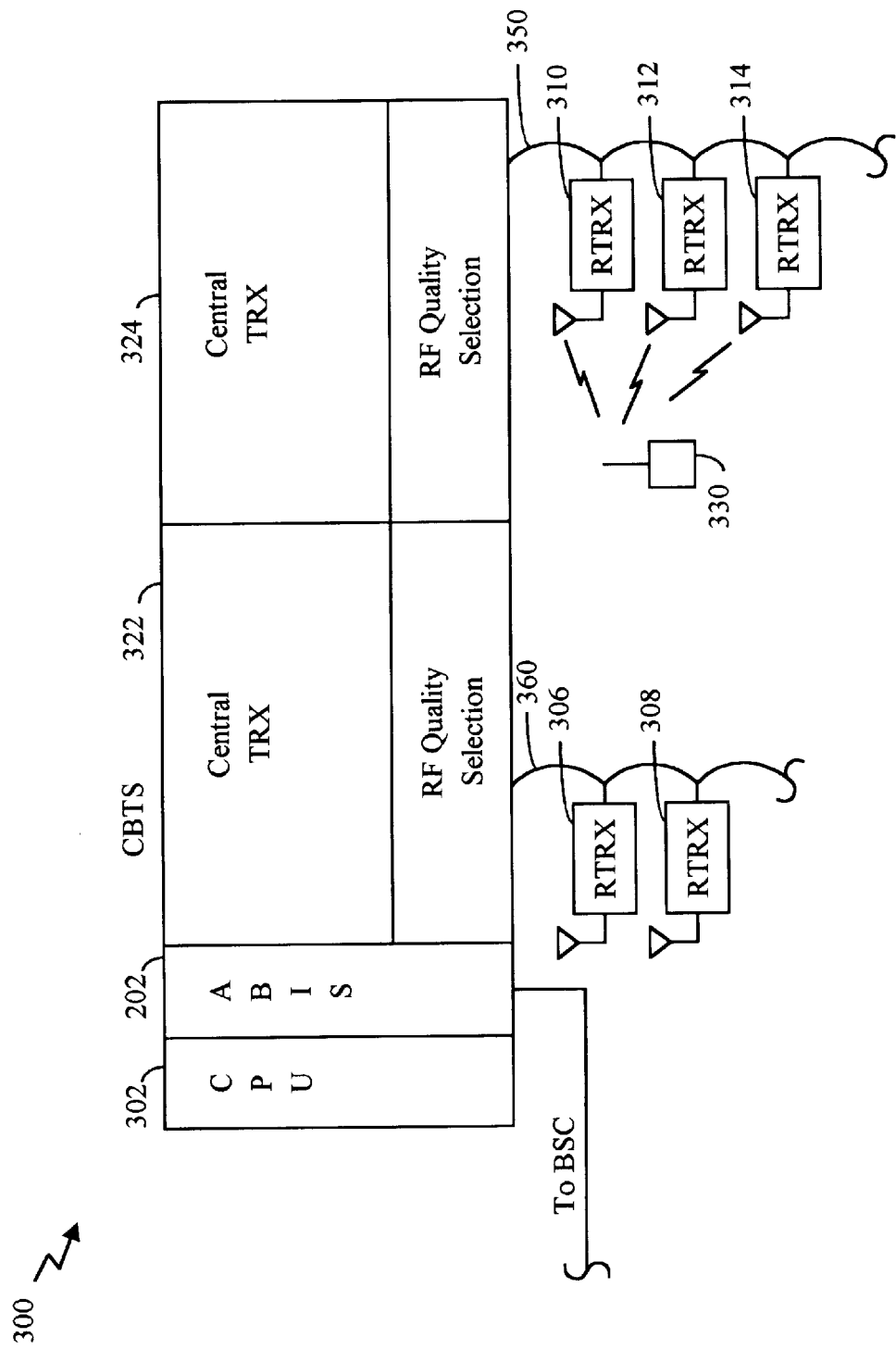
FIG. 3 illustrates, in accordance with one embodiment of the invention, a concentrated BTS (CBTS), including the remote transceivers (TRX's).

The features and advantages of the present invention may be better understood with reference to the figures below. FIG. 3 illustrates, in accordance with one embodiment of the invention, a concentrated BTS (CBTS) 300, including ABIS interface 202. From the perspective of the remainder of the cellular network, e.g., the BSC's and the MSC's that are above CBTS 300, CBTS 300 preferably appears substantially similar to a prior art BTS. As discussed hereinbelow, however, CPU subsystem 302 and the central and remote TRX's of CBTS 300 are substantially different from the CPU subsystem and the TRX's of the prior art.

In CBTS 300, the antenna circuitries are implemented in remote TRX subsystems. With reference to FIG. 3, the antennas are shown on remote TRX's 306, 308, 310, 312, and 314. Although each remote TRX is shown with a single antenna, a remote TRX may be implemented with separate transmit and one or more receive antennas, as is known. Each remote TRX preferably includes the antenna circuits, e.g., the radio interface circuitry, as well as circuitries necessary to process, in the uplink direction, the received RF signals into binary data bits to be sent to the central TRX (discussed hereinbelow). Additionally, each remote TRX preferably includes circuitries necessary to process the downlink binary data bits received from the cellular network (via the central TRX) into RF signals to be transmitted to the MS's.

A plurality of central TRX's 322 and 324 are implemented in CBTS 300. Each central TRX is coupled at any given time to a unique set of remote TRX's. In the implementation shown, remote TRX's 306 and 308 are coupled to central TRX 322 while remote TRX's 310, 312, and 314 are coupled to central TRX 324. The coupling between a remote TRX and its central TRX may take place through any appropriate transmission medium including, for example, twisted pairs, co-axial cables, or fiber optics. In one embodiment, the transmission medium represents a twisted pair, and the traffic data, the radio control and status are passed between the central TRX and the remote TRX through an Asynchronous Transfer Mode (ATM) link using a digital baseband physical layer protocol (T1, E1, E2, E3, DS1, DS3, or the like). Although each set of remote TRX's is shown in FIG. 3 to be in a daisy-chain arrangement, individual remote TRX's may be coupled to its associated central TRX in parallel if desired.

In general, any number of remote TRX's may be coupled to a central TRX, and data from each remote TRX may bear an appropriate identifier to permit the central TRX to identify the remote TRX from which the data is sent. In practice, the number of remote TRX's may be limited to a reasonable number to suit the processing capabilities of the central TRX and/or to avoid overwhelming the transmission channel between the remote TRX's and the central TRX (e.g., to avoid overwhelming transmission channel 350 in FIG. 3). If the physical layer framing on transmission channel 350 is E1 (30 DS0s), about 5 or 6 (or more if capacity permits) remote TRX's works well. For E2 physical layer framing, about 22 (or more if capacity permits) remote TRX's may be daisy-chained to a central TRX. For E3 physical layer framing, a greater number (e.g., 88 or even more) remote TRX's may be daisy chained due to the greater bit rate on the transmission channel.

It should be appreciated that since it is no longer necessary to position CBTS 300 for optimum RF transmission with the MS's, CBTS 300 may be located anywhere convenient, e.g., in the back office. The remote TRX's, being smaller, simpler, and more rugged, may advantageously be positioned throughout the cell for optimum transmission quality and capacity.

As the antenna circuits are remoted from the CBTS (e.g., via cabling), the CBTS needs not be considered the base of the cell. With the present invention, each central TRX now effectively defines an aggregate cell, which is made up of the radio cells of the associated remote TRX's. The remote TRX's themselves, being remoted from the central TRX (e.g., via cabling) may be dispersed anywhere within the cell and may even be interspersed among remote TRX's which are associated with other central TRX's. It should be appreciated that the multiplicity of sets of remote TRX's, as well as their ease of positioning, offers the service provider flexibility in cell shaping in a manner that is simply unattainable in the prior art.

The individual radio cell may of course be shaped further using traditional antenna techniques, e.g., using directional antennas or increasing the transmit power. If transmit power is increased, the additional heat and power generated do not pose a danger to the processing circuitries of the CBTS as in the case of the prior art BTS circuitries, which are co-resident with the antennas of the prior art TRX's. On the other hand, it is typically the case that a given area previously covered by a high power TRX may be covered as well by multiple remote TRX's, each transmitting at a lower power level. In this manner, a given area may be covered with an array of simple, rugged and lower power remote TRX's, thereby substantially reducing the costs of implementing the BTS's, as well as minimizing the potential for cell-to-cell interference, and/or improving frequency reuse. The ability to employ lower power antennas while offering equivalent or better coverage in a given area is yet another advantage of the present invention.

In an antenna diversity application, each central TRX essentially represents a separate RF channel during use, data from a given MS in the cell may be picked up by more than one remote TRX's. Accordingly, the central TRX preferably includes RF quality selection circuitries for selecting the remote TRX whose transmission quality is the best so that the selected remote TRX may be employed for communication with the MS during the call. In the antenna diversity application, since each central TRX and its associated set of remote TRX's represent an RF channel at any given time, an MS communicating on that channel may be picked up by more than one remote TRX. With reference to FIG. 3, for example, RF signals from MS 330 may be picked up by the antennas within the set of remote TRX's containing remote TRX's 310, 312, and 314. Central TRX 324 preferably includes RF quality selection circuitries for selecting among the set of remote TRX's 310, 312, and 314 the remote TRX which offers the best transmission quality. If remote TRX 312 is found to offer the best transmission quality, central TRX 324 may employ the antennas within remote TRX 312 for subsequent communication with MS 330. Selection may be made, in one embodiment, by comparing the receive equalizer quality and the Receive Signal Indicator Strength (RSSI) from the various remote TRX's and selecting the best from those received. In a TDMA system (GSM) this selection may be done for each TDMA burst.

Figure 4:
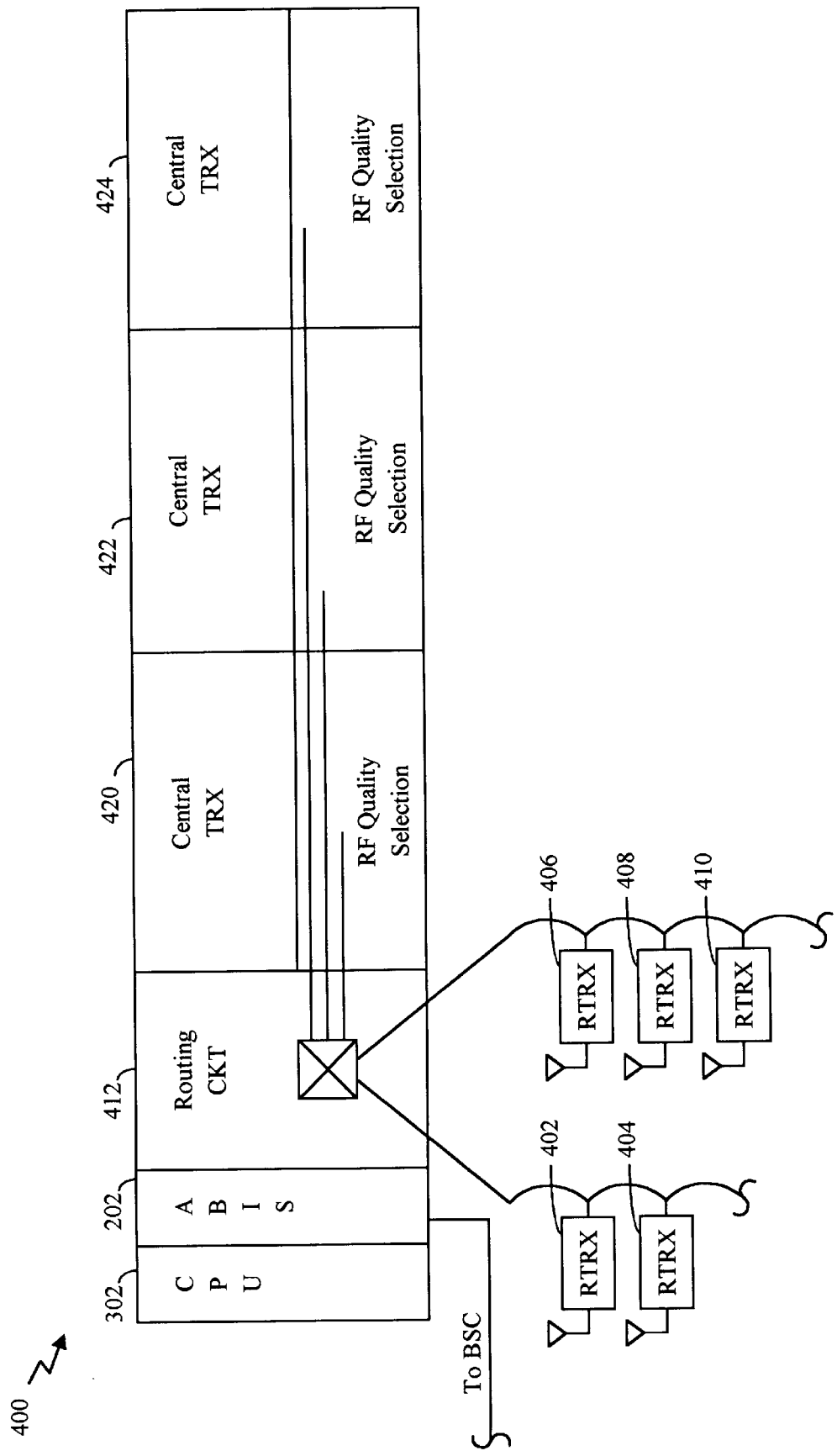
FIG. 4 illustrates, in accordance with one embodiment of the present invention, a CBTS having dynamic configuration capability.

In FIG. 3, each set of remote TRX's is shown directly coupled to its associated central TRX via the appropriate transmission medium. In one embodiment, routing resources may be provided in both the remote TRX's and the CBTS to facilitate dynamic assignment of, for example, CBTS Digital Signal Processing (DSP) resources to remote TRXs of the aggregate cells. FIG. 4 shows such an implementation wherein remote TRX's 402, 404, 406, 408, and 410 of CBTS 400 are daisy-chained to routing circuit 412. In one embodiment, routing circuit 412 represents an Asynchronous Transfer Mode (ATM) routing circuit. A database, table, or intelligent algorithm controlling routing circuit 412 determines which remote TRX is assigned to which of central TRX's 420, 422, and 424. In this case, each remote TRX's may be associated with a unique ATM address and provided with appropriate ATM framing circuits to packetize the demodulated RF data for transmission to routing circuit 412 or to depacketize the ATM data packets sent from routing circuit 412. Traffic data, radio control, and status data may be packed, in one embodiment, into the ATM cells for transmission between a remote TRX and its associated central TRX at up to about two bursts per cell. Analogous techniques may be employed if a Frame Relay Protocol is used.

The use of routing circuit 412 advantageously facilitates dynamic DSP assignment of the aggregate cells associated with central TRX's 420 and 422 to handle changes in capacity requirements. The dynamic configuration may be accomplished by simply changing the routing table or database that routing circuit 412 uses to route data between the central TRX's and the remote TRX's. By way of example, at time To remote TRX 402 may be routed to central TRX 420, remote TRX 404 may be routed to central TRX 422, and remote TRX's 406, 408, and 410 may be routed to central TRX 424. If capacity in the vicinity of remote TRX's 408 and 410 increases at time $T_1$, either temporarily or permanently, dynamic DSP assignment may be employed to route data from remote TRX 410 to its own central TRX 424, remote TRX 408 to its own central TRX 422, and redistribute the remaining remote TRX's 402, 404, and 406 to central TRX 420. Since the area in the vicinity of remote TRX 408 and the area in the vicinity of remote TRX 410 do not have to share central TRX's after reconfiguration, more capacity may be handled in these areas. As can be appreciated by those skilled in the art, dynamic DSP assignment substantially simplifies the task of redistributing capacity when remote and/or central TRX's are added or removed from the CBTS.

In general, there is no limit to the number of central TRX's that may be implemented in a given CBTS. In practice, the number of central TRX's are scaled corresponding to the processing (and routing if the Dynamic DSP Assignment implementation is desired) capabilities of the CBTS. Since each additional central TRX adds an additional RF channel to the BTS, it is desirable to endow CPU 302 of FIGS. 3 and 4 with sufficient processing capabilities to ensure that all calls are properly handled. By way of example, in one non-antenna diversity application, each remote radio may provide one GSM frequency channel (8 traffic channels). Depending on the design of the CTRX, one CTRX can process any number of RTRXs (around 8 to 16 in one example). In some embodiments, parallel processing techniques may be employed to enable the CBTS to handle a large number of central TRX's. Such CPU scaling exercise is within the skills of those skilled in the art given this disclosure.

Figure 5:
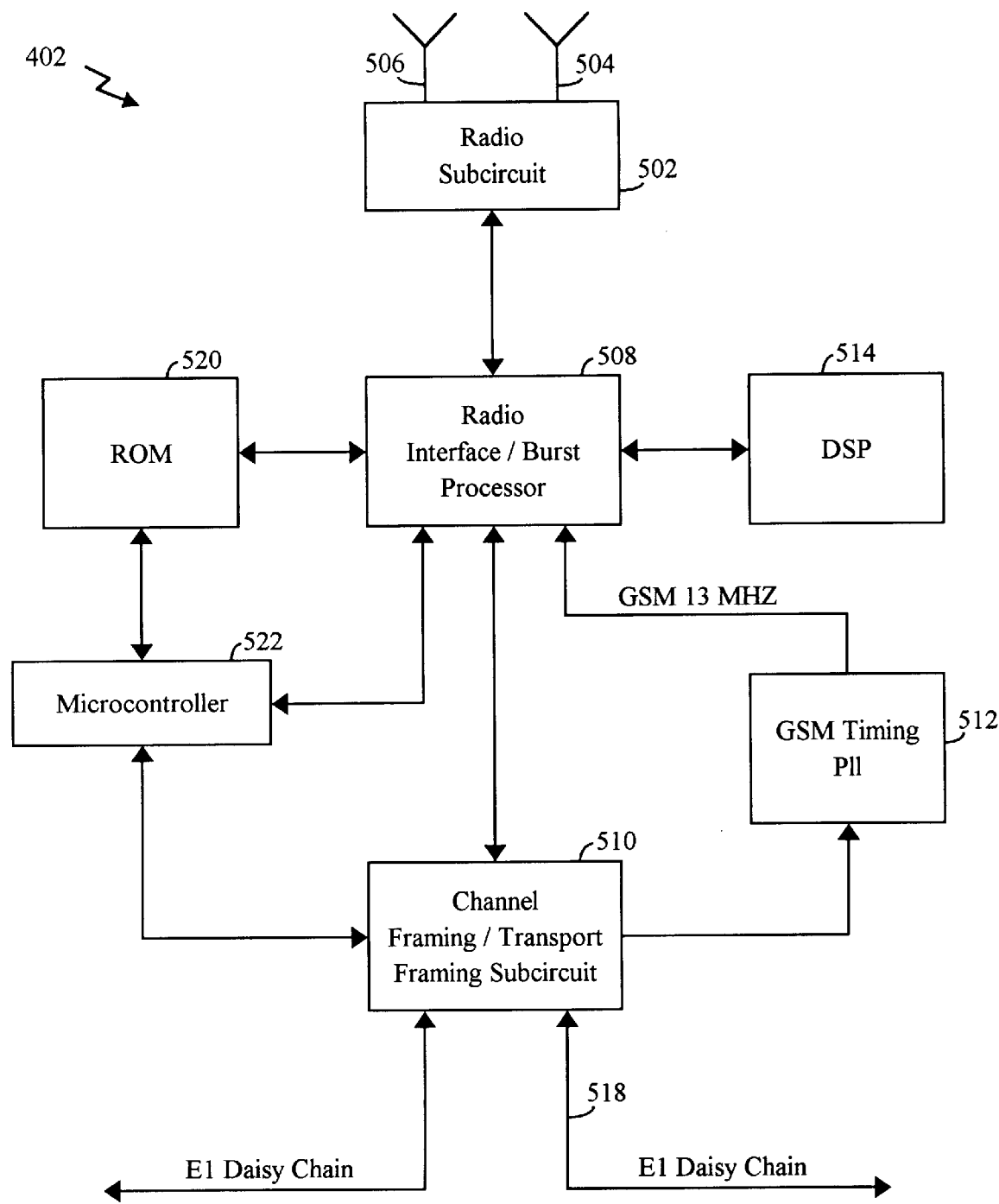
FIG. 5 shows, in accordance with one embodiment of the present invention, a logic block diagram of a remote TRX.

FIG. 5 shows, in accordance with one embodiment of the present invention, a logic block diagram of a remote TRX, e.g., remote TRX 402 of FIG. 4.

Remote TRX 402 includes a radio subcircuit 502, whose basic function is to transmit and receive user data over the air. Two antennas are shown coupled to radio subcircuit 502: a transmit antenna 504 and a receive antenna 506. Although two antennas are shown herein, both receive and transmit antennas may be integrated into a single antenna, as is known.

Radio interface subcircuit 508 receives packetized data from physical layer framing/transport framing interface subcircuit 510 and formats the downlink data into bursts for transmission to radio subcircuit 502, along with the frequency and power information for the burst. In one embodiment the frequency information itself is recovered from a Global Positioning System (GPS) terminal and synchronized to the proper specification (e.g., GSM specification) using timing phase locked loop (PLL) subcircuit 512. On the receive side, radio interface subcircuit 508 takes the demodulated data out of receive antenna 506 and packetizes it for transmission to the central TRX via the daisy-chain transmission medium 518 (which may implement, for example, the E1 protocol). In one embodiment, radio interface subcircuit 508 is implemented using a field programmable gate array (FPGA).

Digital Signal Processing (DSP) subcircuit 514 performs the modulation of the binary signals received from the cellular network for transmission via transmit antenna 504, demodulation of the RF signal received via receive antenna 506, as well as signal equalization. In one embodiment, DSP subcircuit 514 is implemented by a general purpose Digital Signal Processor (DSP).

A read-only memory subcircuit 520 stores configuration data for configuring remote TRX 402 upon start up. Microcontroller 522 provides house keeping functions such as status checks, diagnostics, and power management. In one embodiment, microcontroller 522 may be employed to take remote TRX 402 out of the daisy-chained loop if remote TRX 402 is found to be defective, e.g., by connecting the input and output of the remote TRX together. Microcontroller 552 also oversees the communication between the remote TRX and its central counterpart. In one embodiment, all communication between the remote TRX and the central TRX is performed via the aforementioned physical layer framing/transport framing interface subcircuit 510. Physical layer framing/transport framing interface subcircuit 510 performs the tasks of formatting and driving data to the CBTS; receiving and deformatting data received from the CBTS; and supervising, controlling and monitoring the health of the connection.

The transport framing protocol is, in one embodiment, a packetized protocol where the data packet contains a preamble, or header, containing an address of the receiver. It may also contain a packet type identifier, serial number, time stamp, and other control information. The termination of the packet contains error correcting fields. Data flow between RTRX and CBTS is mapped to the transport protocol packets so that one transport packet typically corresponds to one radio TDMA burst. Frequency, power and user data may be included in each downlink (RTRX to MS) transport packet. Receive quality status, signal strength and user data may be part of the uplink (MS to RTRX) transport packet.

The packetized transport protocol also allows system-defined transport packets that are not transmitted over the air. The definition of the system messages may depend on the partition of functions between the CTRX and RTRX. An exemplary type of system message may be a specially defined timing packet. This timing packet is broadcasted to all remote radios and is used to synchronize the TDMA frames of all remote radios. One embodiment may use the Global Positioning Satellite network as a time reference. A time stamp may be passed to remote radios and each remote radio may calculate the time delay through the network from a local GPS reading relative to the time stamp. Another system transport packet may be call setup information that is transported only once per mobile call session. An example would be the encryption key to cipher the user data. Remote radio status and control information would be another example of a system transport packet.

The use of the packet transport protocol between remote radios and CBTS allows the service provider great flexibility in physical connectivity of the radio network. The capacity of the communication medium becomes, in one embodiment, a function of traffic load, rather than control demands of the physical radios. This flexibility was previously unavailable in the prior art.

As can be appreciated from FIG. 5, the design of a remote TRX is deliberately kept simple to promote ruggedness and simplify maintenance. In one embodiment, the remote TRX preferably includes the subcircuits necessary for interfacing the remote TRX with the physical layer framing and transport framing protocols (e.g., E1 and ATM), digital signal processing subcircuits for equalization and demodulation of the received RF data, and the RF radio subcircuits themselves. All other circuits traditionally associated with the prior art TRX's and BTS are preferably kept in the concentrated BTS (CBTS). In one embodiment, the CBTS may include circuits for interfacing the central TRX with the physical layer framing and transport framing protocols (e.g., E1 and ATM) to communicate with the remote TRX, digital signal processing subcircuits for convolution encoding, decoding, bit interleaving, and burst formatting. Additionally, the CBTS may also include the interface to the BSC.

Figure 6:
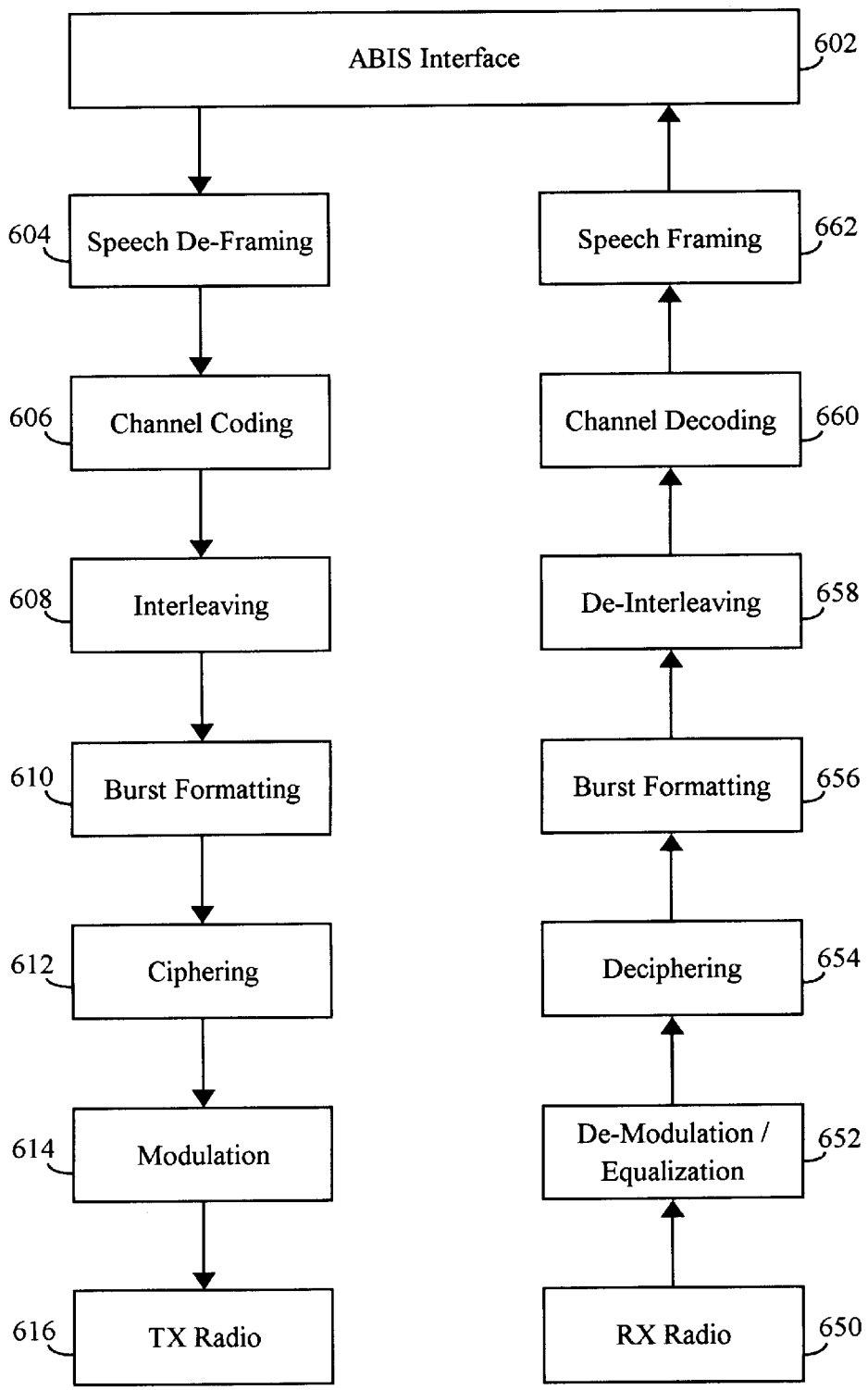
FIG. 6 is a block diagram illustration of the data flow within a prior art GSM BTS module during transmit and receive.

The division of labor between the remote TRX and the central TRX within the CBTS may be better understood with reference to the exemplary implementations of FIGS. 6 and 7. FIG. 6 is a block diagram illustration of the data flow within a prior art GSM BTS module during transmit and receive. With reference to FIG. 6, data to be transmitted to the MS's are received from the BSC via an ABIS interface 602. Speech De-framing block 604 extracts the digital data from the ABIS frame and passes it to Channel Coding block 606, whose purpose is to package the extracted digital data for eventual transmission using the RF medium. The data is then interleaved on a multiplicity of bursts to minimize the risk of losing consecutive bits during transmission in Interleaving block 608. The bursts are then formatted in Burst Formatting block 610 and optionally ciphered for security in Cipher block 612. Thereafter, the digital data is modulated (e.g., using Gaussian Minimum-Shift Keying) for transmission to the MS's as RF signals via Tx Radio block 616.

On the receive side, RF signals from the MS's are received at Rx Radio block 650, and demodulated into digital data and equalized in Demodulation/Equalization block 652. Deciphering, if any, is performed in Deciphering block 654. Burst Formatting block 656 extracts user data and from the speech frame and builds it with the appropriated midamble into a 148 bit burst. Thereafter, De-Interleaving block 658 reassembles the data from groups of bursts. The digital data is then stripped using Channel Decoding block 660 to extract the user data. Speech Framing block 662 frames the stripped digital data into ABIS frames for transmission to the BSC. The functional blocks of FIG. 6 are well known to those skilled in the GSM art. As mentioned, circuitries necessary for implementing the functional blocks of FIG. 6 are typically implemented in one box in the prior art, i.e., these circuits are co-resident in the prior art BTS.

Figure 7A:
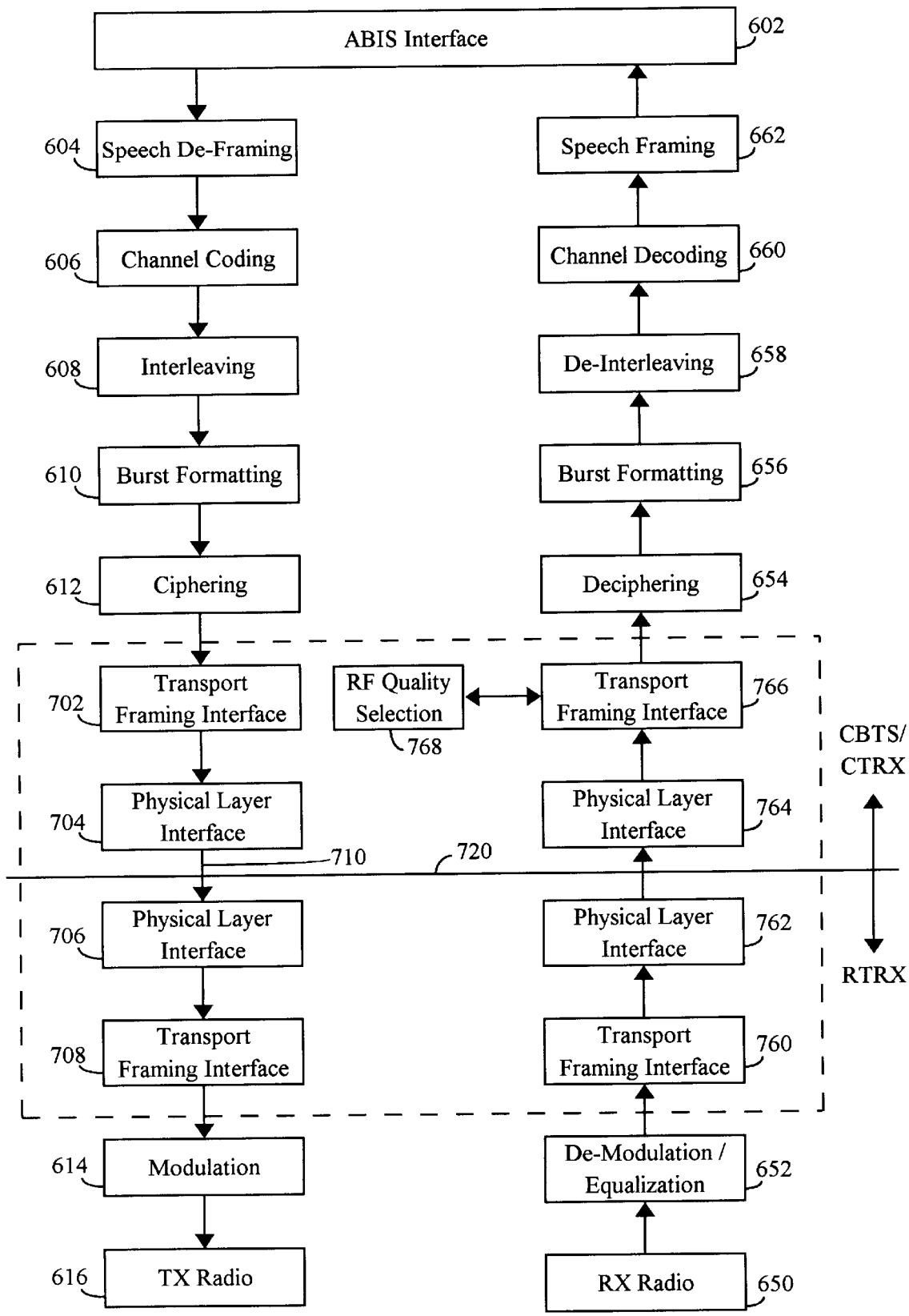
FIGS. 7A, 7B and 7C illustrate, in accordance with various embodiments of the present invention, the data flow within the inventive CBTS during transmit and receive.

To contrast, FIG. 7A illustrates, in accordance with one embodiment of the present invention, the data flow within the inventive CBTS during transmit and receive. In FIG. 7A, ABIS interface block 602, as well as blocks 604, 606, 608, 610, and 612 on the downlink path and blocks 654, 656, 658, 660, and 662 in the uplink path perform substantially the same functions as corresponding blocks in FIG. 6. As these blocks have been discussed earlier, they will not be repeated here for brevity's sake. To facilitate remote communication between the central TRX in the CBTS and the remote TRX, additional physical layer framing and transport framing functional blocks have been added. On the transmit side, these are shown as transport framing interface blocks 702 and 708, with transport framing interface block 702 being co-resident with the CBTS and its counterpart transport framing interface block 708 being implemented in the remote TRX. The transport framing may employ the well known ATM protocol or Frame Relay protocol, as mentioned earlier.

Also on the transmit side, physical layer framing for communication between the remote TRX and the central TRX is implemented via physical layer framing interface blocks 704 and 706, with physical layer framing interface block 704 being co-resident with the CBTS and its counterpart physical layer framing interface block 706 being implemented in the remote TRX. In one embodiment, as the ciphered digital data is outputted from Cipher block 612, it is packetized into ATM frames (block 702) and framed for transmission via the E1 protocol (block 704). This data is transmitted to the remote TRX via the transport link 710. Upon receiving the data, the remote TRX extracts the data from the E1 frame (block 706) and de-packetizes the data (block 708). The de-packetized data is then modulated (block 614) and transmitted out to the MS's via transmit radio block 616.

Note that line 720 signifies the demarcation between the functional blocks implemented in the remote TRX and those implemented in the CBTS/central TRX. In practice, the functional blocks above line 720 in FIG. 7A are typically implemented in a single CBTS/central TRX box (and even on the same backplane in some cases). The functional blocks below line 720 of FIG. 7A are implemented in the remote TRX, which is typically located some distance away from the CBTS/central TRX. This is in contrast to the prior art BTS of FIG. 6 wherein all the major blocks shown therein are co-resident with the BTS.

On the receive side of FIG. 7A, RF signals from the MS's are received by Rx radio block 650 and demodulated into digital data in Demodulation/Equalization block 652. The demodulated data, as well as the RF quality data obtained in the equalization process, is then transmitted to the central TRX in the CBTS via transport framing interface blocks 760 and 766. Again, physical layer framing interface blocks 762 and 764 are provided to facilitate framing of the demodulated data for transmission via the physical layer protocol. If multiple remote TRX's are provided in an antenna diversity application, for example, optional RF quality selection block 768 may be employed to select among the remote TRX's one which offers the best transmission quality. Note that this selection may be performed prior to any transmission of user data, e.g., as the called MS answers a page from the network. Thereafter, data from the selected remote TRX is deciphered (if desired), formatted, de-interleaved, channel decoded, and framed via blocks 654, 656, 658, 660, and 662 in the manner discussed in connection with FIG. 6 prior to being transmitted to the BSC via ABIS interface block 602.

Figure 7B:
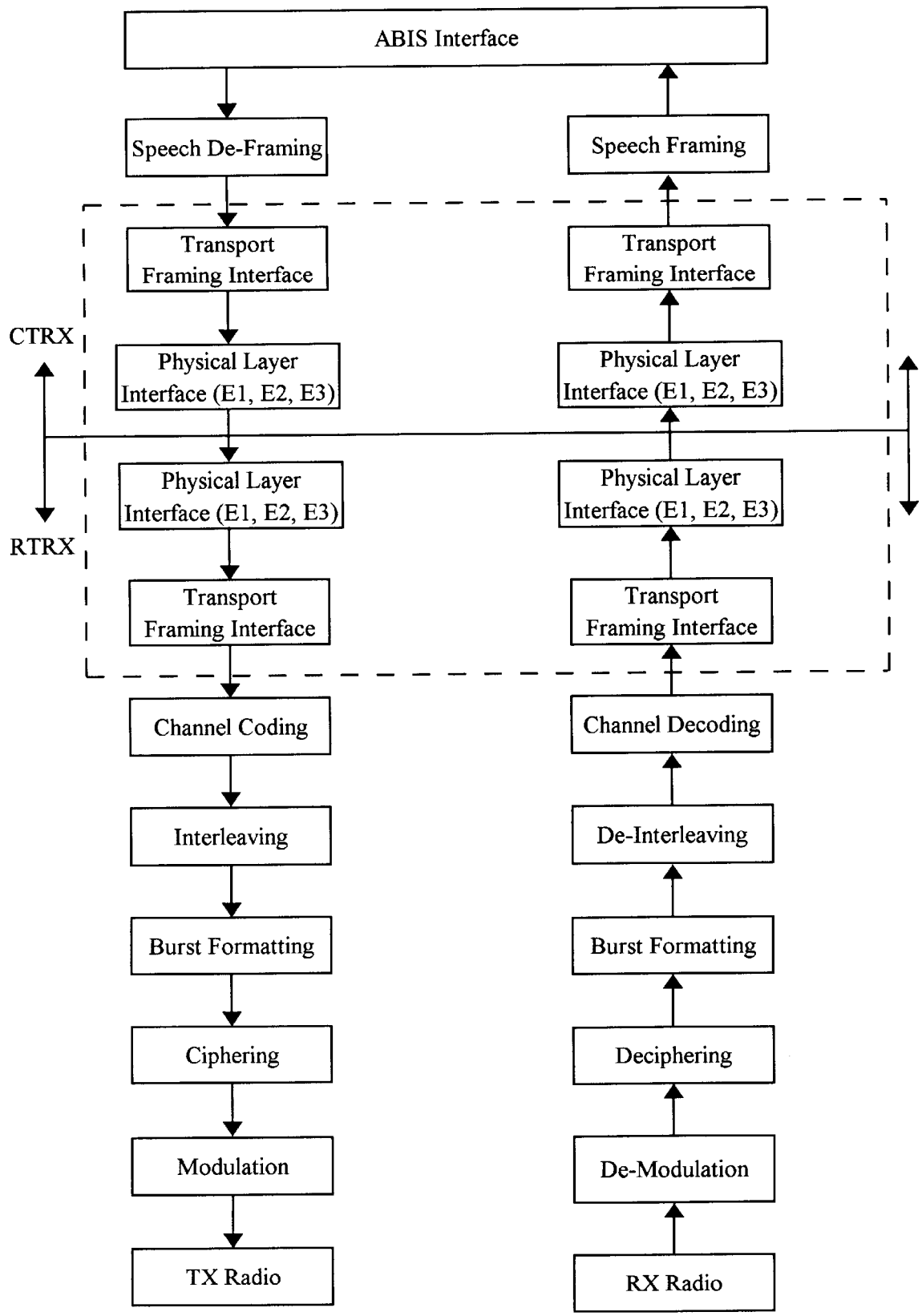

Although the division between the remote TRX and the central TRX occurs in between the ciphering and modulation blocks in the transmit direction and the deciphering and demodulation/equalization blocks in the receive direction, such is not a limitation of the invention. In fact, it is contemplated that the split between the remote and central TRX's may occur anywhere in the transmit and receive paths. FIG. 7B illustrates one exemplary application wherein the split between the remote and central TRX's occurs between other blocks of the BTS. In FIG. 7B, the split between the remote and central TRX's occurs between the speech de-framing and channel coding blocks in the transmit path and between the speech framing and channel decoding blocks in the receive paths. Of course the split may take place between any other blocks if desired.

Figure 7C:
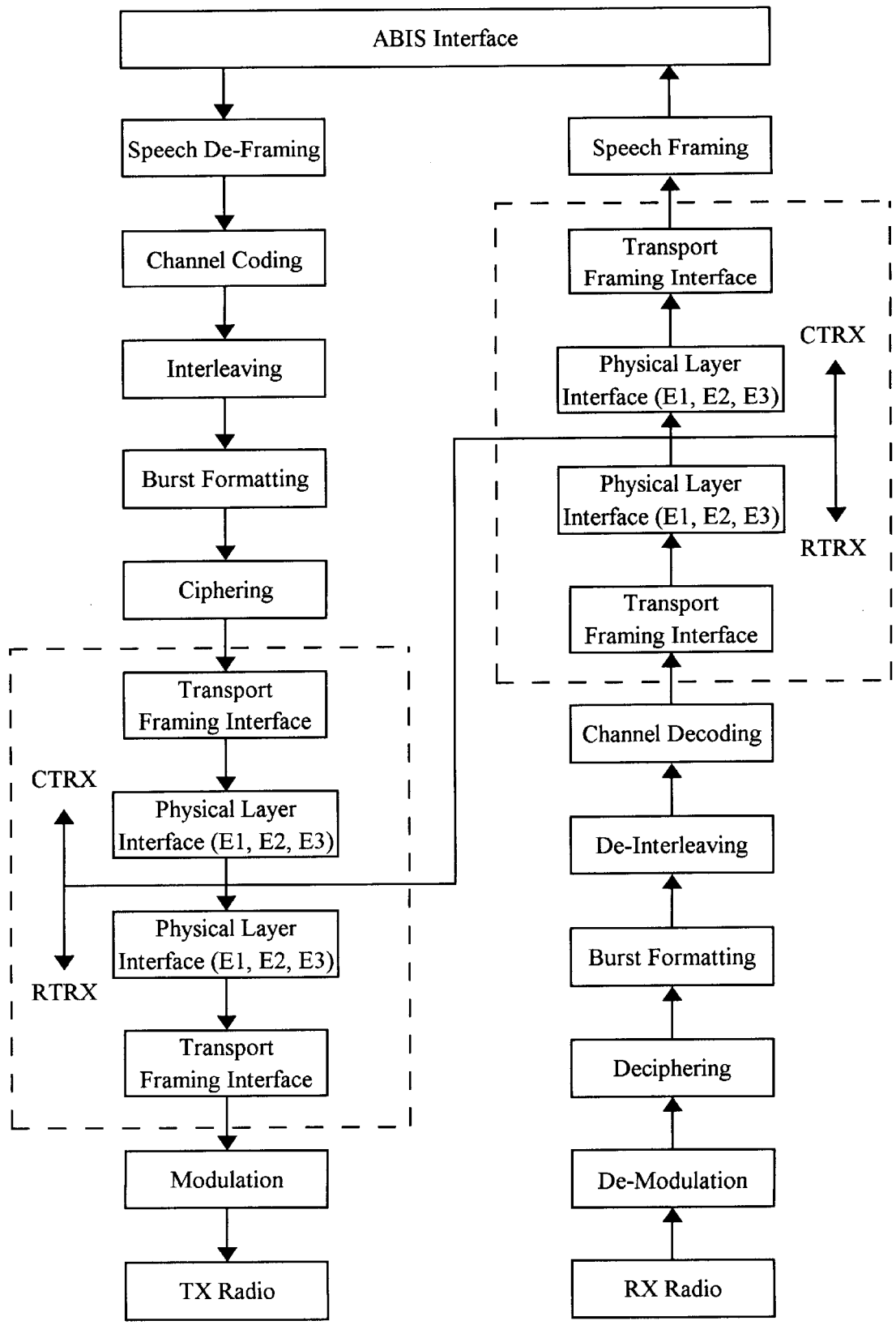

Note that it is not necessary that the split between the remote and central TRX's be symmetrical in the transmit and receive paths. FIG. 7C illustrates one exemplary application wherein the split between the remote and central TRX's is asymmetrical such that there is more transmit path circuitries in the central TRX than there are receive path circuitries. Again, the exact locations in the transmit and receive paths where the remote and central TRX's may be split are implementation specific.

As can be appreciated from the foregoing, the invention allows the remote TRX's to be implemented as simple, rugged, and low-maintenance remote antennas. These remote TRX's may then be deployed throughout the area to be covered, with the bulk of the delicate and expensive circuitries being implemented in the CBTS and located out of the elements and/or in an easy-to-access location for maintenance and upgrade. In the antenna diversity application, the use of multiple simple remote TRX's advantageously minimizes duplication of logic, as only simple remote radios (instead of the entire TRX as in the case of the prior art) need to be duplicated. The logic in the CBTS may be shared by multiple radios.

Since multiple remote TRX's may be coupled to a single central TRX in the antenna diversity application, the inventive architecture offers great flexibility in configuring the cell. Cell shaping is no longer limited to modifying antenna shape and transmit range around the BTS. With the inventive CBTS architecture, cabling can be run from a central TRX to any number of geographically dispersed remote TRX's to form an aggregate cell out of the geographically dispersed radio cells. With multiple central TRX's per CBTS, the service provider is given great latitude in configuring the cell.

As mentioned, multiple inexpensive low-power remote TRX's may now be employed in place of the high power TRX of the prior art to cover the same area. Beside reducing the costs of the radio circuits, the invention also promotes frequency reuse since each radio cell (associated with each remote TRX) may be made smaller. Also as discussed, the ability to dynamically associate one or more remote TRX with a given central TRX offers the service provider great flexibility in reconfiguring the cell to adapt to changes in capacity using the existing set of remote/central TRX's or additional remote/central TRX's.

While this invention has been described in terms of several preferred embodiments, there are alterations, permutations, and equivalents which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. In a cellular communication system having a base station controller (BSC) and a mobile services switching center (MSC), a base transceiver station (BTS) for facilitating communication between said BSC and a plurality of mobile stations (MS's), said communication with said plurality of said MS's being accomplished via radio frequency (RF) medium, comprising:

a first interface circuit for coupling said BTS with said BSC;

a processor coupled to said first interface circuit for processing first digital data received from said BSC to form second digital data;

a first central transceiver (CTRX) circuit coupled to said processor, said first CTRX circuit being co-resident with said processor and said first interface circuit of said BTS;

a first remote transceiver (RTRX) circuit coupled to said first CTRX circuit to facilitate communication of digital data therebetween, said first RTRX circuit including a first antenna circuit for communicating with a first MS of said plurality of MS's via said RF medium, wherein RTRX circuits associated with said BTS are implemented in a geographically remote manner from said BTS;

a second remote transceiver (RTRX) circuit coupled to said first CTRX circuit to facilitate communication of digital data therebetween, said second RTRX circuit including a second antenna circuit for communicating with said first MS via said RF medium, said first CTRX circuit includes an RF quality selection circuit for selecting one of said first RTRX circuit and said second RTRX circuit for use in communicating with said first MS;

a second central transceiver (CTRX) circuit coupled to said processor, said second CTRX circuit being co-resident with said processor and said first interface circuit;

a third remote transceiver (RTRX) circuit coupled to said second CTRX circuit to facilitate communication of digital data therebetween, said third RTRX circuit including a third antenna circuit for communicating with a second MS of said plurality of MS's via said RF medium, wherein said third RTRX circuit is implemented in a geographically remote manner from said second CTRX circuit, wherein said first RTRX circuit and said third RTRX circuit are coupled to said first CTRX circuit and said second CTRX circuit respectively via a routing circuit, said routing circuit being configured to dynamically route one of said first RTRX circuit and said third RTRX circuit to a respective one of said first CTRX circuit and said second CTRX circuit.

2. The base transceiver station of claim 1 wherein said routing circuit is an Asynchronous Mode Transfer (ATM) routing circuit.

3. The base transceiver station of claim 1 wherein said routing circuit is a Frame Relay routing circuit.

4. In a cellular communication system having a base station controller (BSC) and a mobile services switching center (MSC), a method for facilitating communication with a first mobile station (MS), comprising:

providing a base transceiver station (BTS) having therein a plurality of central transceiver (CTRX) circuits and a routing circuit coupled to said plurality of CTRX circuits;

providing a plurality of remote transceiver (RTRX) circuits, said plurality of RTRX circuits being disposed in a geographically remote manner from said BTS and coupled to said routing circuit for transmitting digital data therebetween;

assigning a first one of said plurality of RTRX circuits to a first one of said CTRX circuits using said routing circuit; and thereafter dynamically reassigning said first one of said plurality of RTRX circuits to a second one of said CTRX circuits using said routing circuit.

5. The method of claim 4 wherein said reassigning is accomplished by changing a routing table employed by said routing circuit.

6. The method of claim 5 wherein said plurality of RTRX circuits are coupled to said routing circuit using a daisy chain configuration.

7. The method of claim 6 wherein said digital data represents voice data transmitted from a user of said mobile station.

8. The method of claim 6 wherein said digital data represents computer data transmitted from a user of said mobile station.

9. The method of claim 4 wherein said digital data is transmitted between said plurality of RTRX circuits and said plurality of CTRX circuits using a packetized transport protocol.

* * * * *